(12) United States Patent
Piroux et al.

(10) Patent No.: US 7,777,933 B2
(45) Date of Patent: Aug. 17, 2010

(54) ELECTROCHEMICAL SYSTEM ON A PLASTIC SUBSTRATE

(75) Inventors: Fabienne Piroux, La Plaine Saint Denis (FR); Gregoire Mathey, Chateauneuf sur Loire (FR); Emmanuel Valentin, Le Plessis Trevise (FR); Samuel Dubrenat, Paris (FR); Pierre Chaussade, Orleans (FR); Francoise Rigal, Sully sur Loire (FR)

(73) Assignee: Saint-Gobain Glass France, Courbevoie (FR)

( * ) Notice: Subject to any disclaimer, the term of this patent is extended or adjusted under 35 U.S.C. 154(b) by 144 days.

(21) Appl. No.: 12/093,892

(22) PCT Filed: Nov. 14, 2006

(86) PCT No.: PCT/FR2006/051169
§ 371 (c)(1),
(2), (4) Date: Sep. 26, 2008

(87) PCT Pub. No.: WO2007/057605
PCT Pub. Date: May 24, 2007

(65) Prior Publication Data
US 2009/0067031 A1  Mar. 12, 2009

(30) Foreign Application Priority Data
Nov. 16, 2005 (FR) ................... 05 53476

(51) Int. Cl.
- G02F 1/15 (2006.01)
- G03B 13/00 (2006.01)
- G09G 3/19 (2006.01)

(52) U.S. Cl. .................. 359/265; 348/817; 345/49
(58) Field of Classification Search ......... 359/265–275, 359/277, 245–247, 254, 242; 345/49, 105; 250/70; 348/817; 438/929
See application file for complete search history.

(56) References Cited

U.S. PATENT DOCUMENTS

| | | |
|---|---|---|
| 5,520,851 A | 5/1996 | Yu et al. |
| 5,618,390 A | 4/1997 | Yu et al. |
| 5,798,860 A | 8/1998 | Yu et al. |
| 5,859,722 A * | 1/1999 | Suga et al. .................. 359/265 |
| 6,136,161 A | 10/2000 | Yu et al. |
| 2002/0048678 A1 | 4/2002 | Hunia et al. |
| 2003/0219632 A1 * | 11/2003 | Schaepkens ................ 428/698 |

* cited by examiner

*Primary Examiner*—Scott J Sugarman
*Assistant Examiner*—Dawayne A Pinkney
(74) *Attorney, Agent, or Firm*—Oblon, Spivak, McClelland, Maier & Neustadt, L.L.P.

(57) ABSTRACT

Electrochemical system comprising at least one substrate of organic nature, at least one electronically conductive layer and at least one active species, characterized in that it includes at least one organic layer lying between the electronically conductive layer and the substrate.

23 Claims, 7 Drawing Sheets

ELECTROCHEMICAL SYSTEM ON A PLASTIC SUBSTRATE

CROSS REFERENCE TO RELATED APPLICATION

This application is a 371 of PCT/FR06/51169, filed Nov. 14, 2006, the entire contents of which are incorporated by reference, and claims priority to French Patent Application No. 0553476, filed Nov. 16, 2005.

The present invention relates to the field of electrochemical devices comprising at least one active species, in particular to the field of electrochromic devices. These electrochemical devices are used especially for manufacturing glazing whose light and/or energy transmission or light and/or energy reflection can be modulated by means of an electric current. Taking the particular example of electrochromic systems, it will be recalled that these comprise, in a known manner, at least one anodic-coloration or cathodic-coloration species having two coloration states corresponding to two oxidation states, one of the states generally being transparent.

Many electrochromic systems are constructed on the following "five-layer" model: TC1/EC1/EL/EC2/TC2, in which TC1 and TC2 are electronically conductive materials, EC1 and EC2 are electrochromic materials capable of reversibly and simultaneously inserting cations and electrons, and EL is an electrolyte material that is both an electronic insulator and an ionic conductor. The electronic conductors are connected to an external power supply and by applying a suitable potential difference between the two electronic conductors the color of the system can be changed. Under the effect of the potential difference, depending on the system considered, the oxidation states are reversed or else the ions are extracted from one electrochromic material and inserted into the other electrochromic material, passing through the electrolyte material. The electronic conductors and the external power circuit which allow the transport of electrons ensure electrical neutrality of the entire system. The electrochromic system is generally deposited on a support, which may or may not be transparent, and organic or mineral in nature, which is then called a substrate. In certain cases, two substrates may be used—either each possesses part of the electrochromic system and the complete system is obtained by joining the two substrates together, or one substrate has the entire electrochromic system and the other one is designed to protect the system.

When the electrochromic system is intended to work in transmission, the electroconductive materials are generally transparent oxides, the electronic conduction of which has been increased by doping, such as the materials $In_2O_3$:Sn, $In_2O_3$:Sb, ZnO:Al or $SnO_2$:F. Tin-doped indium oxide ($In_2O_3$:Sn or ITO) is frequently chosen for its high electronic conductivity properties and its low light absorption. When the system is intended to work in reflection, one of the electroconductive materials may be of metallic type.

One of the electrochromic materials most used and most studied is tungsten oxide, which switches from a blue color to transparent depending on its charge insertion state. This is a cathodic coloration electrochromic material, that is to say its colored state corresponds to the inserted (or reduced) state and its bleached state corresponds to the extracted (or oxidized) state. During construction of a five-layer electrochromic system it is common practice to combine it with an anodic coloration electrochromic material, such as nickel oxide or iridium oxide, the coloration mechanism of which is complementary. This results in an enhancement in the light contrast of the system. It has also been proposed to use a material that is optically neutral in the oxidization states in question, such as for example cerium oxide. All the abovementioned materials are of inorganic type, but it is also possible to combine organic materials, such as viologens (bipyridium salts), 5,10-dihydrophenazines, 1,4-phenylenediamines, benzidines, metallocenes, Prussian blues or electronically conductive polymers (polythiophene, polypyrrole, polyaniline etc.) or metallopolymers, with inorganic electrochromic materials, or even to use only organic electrochromic materials.

When a multilayer structure based essentially on organic materials is used, the five-layer structure may be simplified to a three-layer structure, namely TC1/AC/TC2, within which the active "layer" AC is in the form of a polymer matrix, a gel or a liquid. The layer AC then comprises, in one of the same medium, all the necessary electroactive materials, namely in particular the anodic-coloration and cathodic-coloration species and optionally ionic salts having an electrolyte function, which are dissolved in a solvent of the propylene carbonate type. Furthermore, the layer AC may also contain one or more polymers and additives. The interpenetrating network polymer systems described in application FR 2 857 759 are also constructed on this three-layer model. Moreover, simple systems conventionally called "viologen" systems, in which cathodic-coloration species, of the type comprising bipyridinium salts (namely viologen materials) and anodic-coloration species (for example phenazines) are dissolved in a liquid or a gel based for example on propylene carbonate are also three-layer systems.

Irrespective of the envisioned structure, provision is made for these electrochemical systems to be deposited on a substrate having an organic glass function, conventionally based on PMMA (polymethyl methacrylate), PC (polycarbonate) PET (polyethylene terephthalate), PEN (polyethylene naphthoate) or COC (cycloolefin copolymer).

Now, the deposition of the abovementioned electrochemical structures on a substrate of essentially organic nature poses a number of problems which the present invention is intended to remedy.

Thus, the inventors have firstly noticed that constituents of the composition of the abovementioned layer AC, which have been deposited directly on a surface portion of the substrate of organic nature, could prematurely age the latter following chemical etching. Moreover, the organic substrate does not always allow the functionality of the layer AC. Furthermore, the interaction with the substrate may degrade the functionality of the layer AC.

The inventors have also made the following observation:

The layer TC1 or TC2, of essentially mineral nature, which is necessary for the operation of the electrochemical system to be all-solid or all-polymer (it allows passage of the current needed to switch from a colored state to a bleached state, or vice versa), poses problems at the interface with the organic substrate. This is because TC1 or TC2, generally based on ITO albeit thick in order to obtain the required resistivity (less than 5 ohms per square), requires deposition at high temperature (several hundred degrees Celsius) in order to improve its crystallinity. This is possible when the substrate having a glass function is inorganic (made of glass) but is very difficult to envision when the substrate is organic.

The object of the present invention is to alleviate the drawbacks by proposing a modification to the substrate of organic nature in order to make it compatible with an electrochemical multilayer stack structure.

For this purpose, the subject of the invention is an electrochemical system comprising at least one substrate of organic nature, at least one electronically conductive layer and at least one active species, characterized in that it includes at least one organic layer lying between the electronically conductive layer and the substrate, a barrier layer, based on silicon nitride, oxide or oxynitride, or based on aluminum nitride or oxide or oxynitride or on a mixture of at least two of these compounds (mixed Si/Al nitrides or oxynitrides) said barrier layer being interposed between the varnish layer and the electronically conductive layer.

By using a layer at the interface between the substrate and the electronically conductive layer, it is possible on the one hand, to improve the adhesion between the substrate and the electronically conductive layer (by compensating for the differences in stresses and in expansion between the substrate and the electronically conductive layer) and, on the other hand, to limit chemical attack of the substrate by the components of the AC system.

In other preferred embodiments of the invention, one or more of the following arrangements may optionally also be employed:

- the substrate comprises PMMA;
- the substrate is drawn PMMA;
- the organic layer is a polysiloxane-based varnish;
- the organic layer has a thickness between 0.5 µm and 10 µm and preferably from 1 to 3 µm;
- the electronically conductive layer is of the metallic type or of the TCO (transparent conductive oxide) type made of ITO, $SnO_2$:F, ZnO:Al, or a multilayer of the TCO/metal/TCO type, this metal being chosen especially from silver, gold, platinum and copper, or a multilayer of the NiCr/metal/NiCr type, the metal also being chosen especially from silver, gold, platinum and copper;
- the barrier layer has a thickness of 50 nm to 500 nm and preferably 100 nm to 300 nm;
- the three-layer system with the electrochemically active central layer AC comprises in one and the same medium, anodic-coloration and cathodic-coloration electroactive materials, one or more solvents, optionally one or more polymers and optionally one or more ionic salts acting, if necessary, as electrolyte;
- the anodic-coloration species are organic compounds such as phenazine derivatives, for example 5,10-dihydrophenazine, 1,4-phenylenediamine, benzidine, metallocene, phenothiazine and carbazole;
- the cathodic-coloration species are organic compounds such as derivatives of viologen (a bipyridinium salt) such as methyl viologen tetrafluoroborates, octyl viologen tetrafluoroborates, or quinone or polythiophene;
- the solvents may be dimethyl sulfoxide, N,N-dimethylformamide, propylene carbonate, ethylene carbonate, N-methylpyrolidinone, γ-butyrolactone, ionic liquids, ethylene glycols, alcohols, ketones and nitriles;
- the polymers may be polyethers, polyesters, polyamides, polyimides, polycarbonates, polymethacrylates, polyacrylates, polyacetates, polysilanes, polysiloxanes and celluloses;
- the ionic salts are for example lithium perchlorate, trifluoromethanesulfonate (triflate) salts, trifluoromethanesulfonylimide salts, ammonium salts or ionic liquids;
- the layer AC has a thickness of 50 µm to 500 µm and preferably 150 µm to 300 µm;
- the active species is in the form of an electrochemically active layer comprising at least one of the following compounds: tungsten (W) oxide, niobium (Nb) oxide, tin (Sn) oxide, bismuth (Bi) oxide, vanadium (V) oxide, nickel (Ni) oxide, iridium (Ir) oxide, antimony (Sb) oxide or tantalum (Ta) oxide, by itself or as a mixture, and optionally including an additional metal such as titanium, tantalum or rhenium; and
- the system further includes a layer having an electrolytic function, chosen from silicon nitride ($Si_3N_4$), molybdenum oxide ($MoO_3$), tantalum oxide ($Ta_2O_5$), antimony oxide ($Sb_2O_5$), nickel oxide ($NiO_x$), tin oxide ($SnO_2$), zirconium oxide ($ZrO_2$), aluminum oxide ($Al_2O_3$), silicon oxide ($SiO_2$), niobium oxide ($Nb_2O_5$), chromium oxide ($Cr_2O_3$), cobalt oxide ($Co_3O_4$), titanium oxide ($TiO_2$), zinc oxide (ZnO) optionally alloyed with aluminum, tin zinc oxide ($SnZnO_x$), vanadium oxide ($V_2O_5$), at least one of these oxides being optionally hydrogenated or nitrided.

Within the context of the invention, a simplified configuration of the transparent substrate TC1/layer AC/TC2/transparent substrate type (three-layer system) in which the material of the layer AC is partitioned between two organic substrates may be used. Moreover, in an "all-solid" (five-layer system) configuration, the manufacture is simplified since it is possible to deposit all of the layers of the system, one after another, on a single carrier substrate. Furthermore, the device is lightened since it is no longer essential to have two carrier substrates. The invention also relates to applications of the electrochemical device relating to electrochromic glazing. In this case, it is advantageous to provide for the substrate or substrates of the device to be transparent, made of plastic, when the glazing is intended to operate in variable light transmission.

When the glazing is intended to operate in variable light transmission, with a device provided with one or two transparent substrates, it can be mounted as multiple glazing, especially double glazing, with another transparent substrate and/or laminated glazing.

Returning to the electrochromic glazing application, the glazing may advantageously be employed as architectural glazing, automotive glazing, glazing for industrial/public transport vehicles, glazing for land transport vehicles, for aircraft (particularly as windows), river-going or sea-going craft, rear-view or other mirrors, or as optical elements, such as camera objectives, or else as the front face or element to be placed on or near the front face of display screens for computers or televisions.

The organic substrates are made of light or dark plastic, of flat or curved shape, and are extremely lightweight compared with inorganic glass substrates. Their thickness may vary between 0.6 mm and 19 mm, depending on the expectations and requirements of the end users. The substrates may be partially coated with an opaque material, in particular around the periphery, especially for aesthetic reasons. The substrate may also have a specific functionality (arising from a stack of at least one layer of the solar-control, antireflection, low-E, hydrophobic, hydrophilic or other type), and in this case the electrochromic glazing combines the functions provided by each element so as to meet the requirements of the users.

A polymer interlayer is used here for the purpose of joining together the two substrates using the lamination procedure commonly used in the automobile or building world so as to end up with a safety or comfort product: anti-ejection or bulletproof safety for use in the transport and anti-break-in field (shatterproof glass) for use in the building field, or providing, thanks to this lamination interlayer, an acoustic, solar-protection or coloration functionality. The lamination operation is also favorable in the sense that it isolates the functional stack from chemical or mechanical attack. The interlayer is preferably chosen based on ethylene/vinyl acetate (EVA) or its copolymers. It may also be made of polyurethane (PU), polyvinyl butyral (PVB), a multi-component or single-component resin that is thermally crosslinkable (epoxy or PU) or UV-crosslinkable (epoxy or acrylic resin). The lamination interlayer is generally transparent, but it may be completely or partially colored in order to meet the wishes of the users.

The isolation of the multilayer stack from the outside is generally supplemented by systems of seals placed along the edges of the substrates, or even partly inside the substrates.

The lamination interlayer may also include additional functions, such as the inclusion of a solar-protection function provided for example by a plastic film comprising ITO/metal/ITO multilayers or a film composed of a stack of organic layers.

The invention also relates to the process for manufacturing the device according to the invention, in which it is possible to deposit the layers of the functional multilayer stack (TC1/EC1/EL/EC2/TC2) by a vacuum technique, of the sputtering type, optionally magnetron or magnetically enhanced sputtering, by thermal evaporation or electron-beam evaporation, by laser ablation, by CVD (Chemical Vapor Deposition), optionally plasma-enhanced or microwave-enhanced CVD.

The active layer AC may be deposited by an atmospheric pressure technique especially by the deposition of layers by sol-gel synthesis, particularly dip coating, spray coating or laminar flow coating. In the case of simplified viologen-type systems, it may be advantageous to use a system for injecting the AC medium between the two substrates. The layers TC1 and TC2 are deposited by a technique similar to that for the five-layer stack structure.

In fact, it is particularly advantageous here to use a vacuum deposition technique, especially of the sputtering type, as it allows very fine control of the characteristics of the layer constituting the electrolyte (deposition rate, density, structure, etc.)

Further advantageous details and characteristics of the invention will emerge from the description given below with reference to the appended drawings which show.

In the appended drawings, certain elements have been shown on a larger or smaller scale than in reality, so as to make the figures easier to understand.

Figure 1:
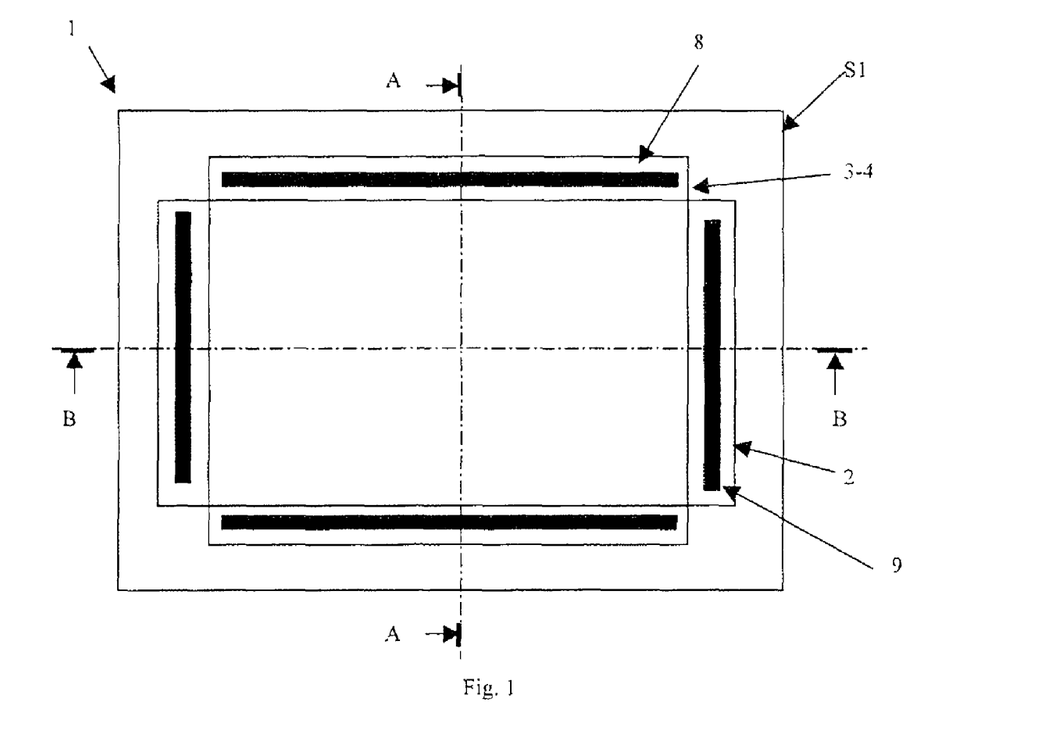
FIG. 1 is a front view of the subject of the invention.
Figure 2:
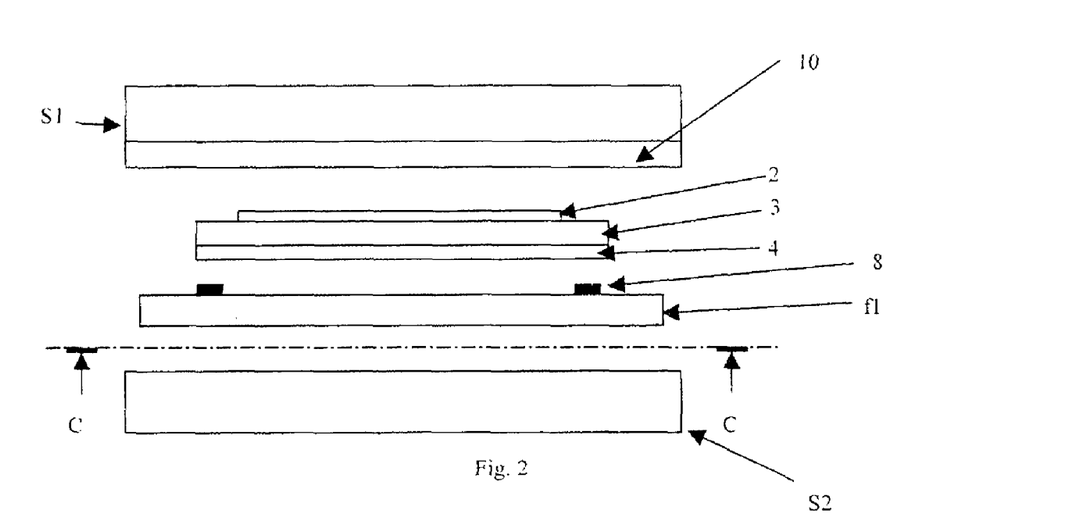
FIG. 2 is a sectional view of AA of FIG. 1, illustrating an embodiment of the invention employing an electrochemical system of essentially inorganic nature also called an "all-solid" system (conventionally a five-layer system)
Figure 3:
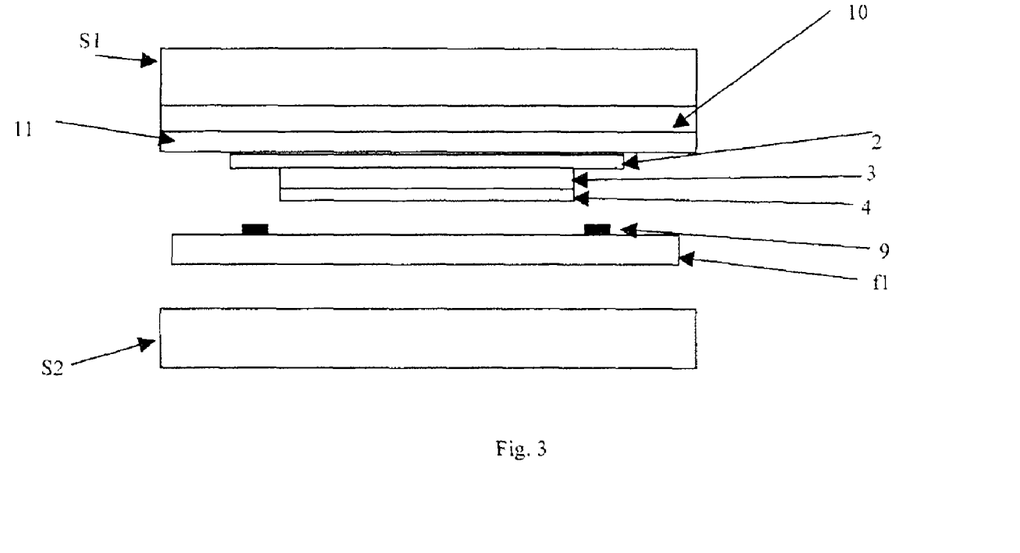
FIG. 3 is a sectional view of BB of FIG. 1, illustrating an embodiment of the invention employing an electrochemical system of essentially inorganic nature.

The example illustrated by FIGS. 1, 2 and 3 relates to electrochromic glazing 1. It comprises in succession, from the outside to the inside of the passenger compartment, two plastic substrates S1, S2, made of drawn PMMA, or made of PC or COC, for example 2.1 mm and 2.1 mm in thickness respectively.

The substrates S1 and S2 are of the same size and their dimensions are 150 mm×150 mm.

The substrate S1 shown in FIGS. 2 and 3 includes, on face 2, a thin-film multilayer stack of the all-solid (five-layer) electrochromic type. The substrate S1 is laminated to the substrate S2 via a thermoplastic sheet F1 made of polyurethane (PU) of 0.8 mm thickness (it may be replaced with a sheet of ethylene/vinyl acetate (EVA) or polyvinyl butyral (PVB)).

It may be seen in the figures that the current collector layers 2 and/or 4 (TC1 and/or TC2 layers for example) are not in direct contact with the substrates S1 and/or S2.

At least one organic layer 10 (visible in FIGS. 2 and 3) is interposed between the substrate and the electronically conductive layer, improving the adhesion of the TC1 and/or TC2 layer to the substrate and preventing the substrate from being chemically attacked by the layer AC, which is of an organic nature, while the electronically conductive layer is of essentially mineral nature.

This organic layer 10 is a varnish based on polysiloxanes. These polysiloxanes are prepared from commercially available silanes (for example from Sigma-Aldrich-Fluka) preferably from tetraethoxysilane (TEOS), methyltrimethoxysilane (MTMS) or phenyl trimethoxysilane (PMTS), with a thickness of between 0.5 μm and 10 μm, preferably 1 to 3 μm.

The organic layer 10 may also be covered with an inorganic layer 11 (shown in FIGS. 2 and 3, 4 and 5), the layer 11 being for example $Si_3N_4$ if a barrier layer is needed or an $SiO_x$ layer formed by PECVD (plasma-enhanced chemical vapor deposition).

The electrochromic thin-film multilayer comprises an active multilayer 3 placed between two electronically conductive materials, also called current collectors 2 and 4. The collector 2 is intended to be in contact with face 2.

The collectors 2 and 4 and the active multilayer 3 may be either substantially of the same size and shape, or substantially of different size and shape, and it will be understood therefore that the path of the collectors 2 and 4 will be tailored according to the configuration. Moreover, the dimensions of the substrates, in particular S1, may be essentially greater than those of 2, 4 and 3. The collectors 2 and/or 4 may also be in the form of a grid or network of wires or the like.

The collectors 2 and 4 are of the metallic type or of the TCO (Transparent Conductive Oxide) type made of ITO, $SnO_2$:F or ZnO:Al, or they may be a multilayer of the TCO/metal/TCO type, this metal being selected in particular from silver, gold, platinum and copper. They may also be a multilayer of the NiCr/metal/NiCr type, the metal again being selected in particular from silver, gold, platinum and copper.

Depending on the configuration, they may be omitted, and in this case current leads are directly in contact with the active multilayer 3.

The glazing 1 incorporates current leads 8, 9 which control the active system via a power supply. These current leads are of the type used for heated windows (namely shims, wires or the like).

A preferred embodiment of the collector 2 is one formed by depositing, on face 2, a doped (especially aluminum-doped or boron-doped) or undoped bilayer consisting of a $SiO_2$-based first layer about 20 nm in thickness followed by an ITO second layer of about 100 to 600 nm in thickness (the two layers preferably being deposited in succession, in a vacuum, by reactive magnetron sputtering in the presence of oxygen).

Another embodiment of the collector 2 is one formed by depositing, on face 2, a monolayer consisting of ITO about 100 to 600 nm in thickness (a layer preferably deposited, in a vacuum, by reactive magnetron sputtering in the presence of oxygen).

The collector 4 is a 100 to 500 nm ITO layer also deposited by reactive magnetron sputtering on the active multilayer.

The active multilayer 3 shown in FIGS. 2 and 3 is made up as follows:

- a 100 to 300 nm layer of anodic electrochromic material made of nickel oxide, possibly alloyed with other metals. As a variant (not shown in the figures), the layer of anodic material is based on a 40 to 100 nm layer of iridium oxide;
- a 100 nm layer of tungsten oxide;
- a 100 nm layer of hydrated tantalum oxide or hydrated silica oxide or hydrated zirconium oxide, or a mixture of these oxides; and
- a layer of cathodic electrochromic material based on hydrated tungsten oxide with a thickness of 200 to 500 nm, preferably 300 to 400 nm, for example about 370 nm.

The active multilayer 3 may be incized over all or part of its periphery with grooves produced by mechanical means or by laser etching, possibly using a pulsed laser. This is done so as to limit the peripheral electrical leakage, as described in French application FR-2 781 084.

The glazing unit shown in FIGS. 1, 2 and 3 also incorporates (but not shown in the figures) a first peripheral seal in contact with faces 2 and 3, this first seal being designed to form a barrier to external chemical attack.

A second peripheral seal is in contact with the edge of S1, the edge of S2 and face 4 so as to form: a barrier, and a means of mounting with the transport means, to provide a seal between the inside and the outside, to form an attractive feature, and to form means for the incorporation of reinforcing elements.

According to other alternative embodiments of the invention, the "all-solid" active multilayer 3 may be replaced with other families of polymer type electrochromic materials.

Figure 4:
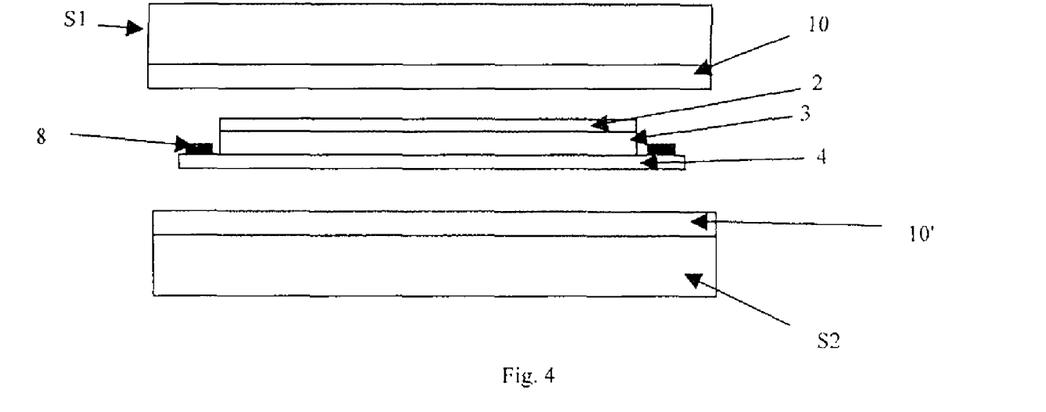
FIG. 4 is a sectional view of AA of FIG. 1, illustrating one embodiment of the invention employing an electrochemical system of essentially organic nature.
Figure 5:
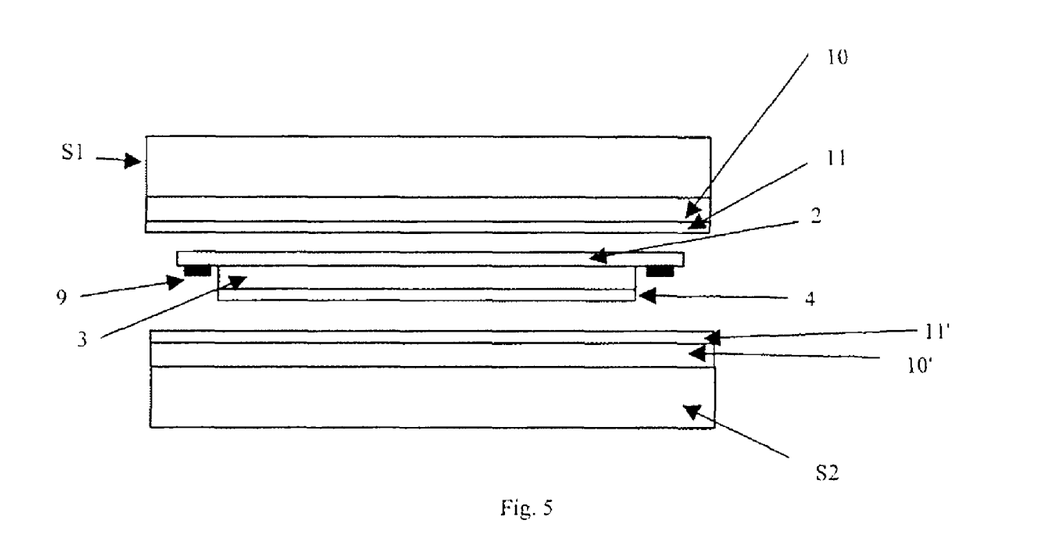
FIG. 5 is a sectional view of BB of FIG. 1, illustrating one embodiment of the invention employing an electrochemical system of essentially organic nature.

In the configuration shown in FIGS. 4 and 5, the electrochromic system (with three or five layers) is assembled directly between two substrates S1 and S2. This is a configuration of the following type: S1/organic layer (10)/inorganic layer (11)/TC1(2)/active medium (3)/TC2(4)/inorganic layer (11')/organic layer (10')/substrate S2.

The active medium 3 may consist of 3 polymer layers in a first variant or a mixed multilayer stack consisting of inorganic layers and polymers in a second variant, or else a single medium consisting of viologens and phenazines dissolved so as to have a typical concentration of $3 \times 10^{-2}$ M for example in propylene carbonate, and in which a tetrabutylammonium tetrafluoroborate salt may be added with a concentration of $5 \times 10^{-2}$ M in order to form the electrolyte support.

These embodiments incorporate the same collectors 2 and 4 described above in the case of the all-solid-type electrochemical systems.

However, they differ by the fact that they do not require a lamination interlayer f1 for assembling the organic substrates S1 and S2.

Thus, according to a first example illustrated in FIG. 4, a first part formed from a layer of electrochromic material, or otherwise called the active layer, made of poly(3,4-ethylenedioxythiophene) from 10 to 10 000 nm, preferably 50 to 500 nm, in thickness on a PET substrate coated with an ITO layer—as a variant, it may be one of the derivatives of this polymer—is deposited by known liquid deposition techniques (spray coating, dip coating, spin coating or flow coating) or else by electrodeposition, on a substrate coated with its current collector, this current collector possibly being a lower or upper conducting layer forming the electrode (anode or cathode) optionally provided with wires or the like. Whatever the polymer constituting this active layer, this polymer is particularly stable, especially under UV, and operates by insertion/extraction of lithium ions ($Li^+$) or alternatively of $H^+$ ions.

A second part acting as electrolyte, and formed from a layer with a thickness of between 50 nm and 2000 μm, and preferably between 50 nm and 1000 μm, is deposited by a known liquid deposition technique (spray coating, dip coating, spin coating or flow coating) between the first and third parts on the first part, or else by injection. This second part is based on a polyoxyalkylene, especially polyoxyethylene. As a variant, it may be a mineral-type electrolyte based for example on hydrated tantalum oxide, zirconium oxide or silicon oxide.

This second electrolyte part deposited on the layer of active electrochromic material, which is itself supported by the organic substrate, including its organic varnish layer, is then coated with a third part, the constitution of which is similar to the first part, namely this third part is made up of a substrate, coated with a current collector, this current collector itself being covered with an active layer.

A second example corresponds to glazing operating by proton transfer. This consists of:

- a first organic substrate S1 made of drawn PMMA, for example 1, 4 mm in thickness; then
- a varnish layer 10;
- a first 300 nm TCO-type electronically conductive layer 2;
- an 185 nm first layer of anodic electrochromic material made of nickel oxide $NiO_xH_y$ (it could be replaced with a 55 nm layer of hydrated iridium oxide);
- an electrolyte made up of a 70 nm first layer of hydrated tantalum oxide, a 100 micron second layer of a POE-$H_3PO_4$ polyoxyethylene/phosphoric acid solid solution, or alternatively a PEI-$H_3PO_4$ polyethyleneimine/phosphoric acid solid solution;
- a 350 nm second layer of cathodic electrochromic material based on tungsten oxide;
- a second 300 nm TCO-type electronically conducting layer 4;
- A varnish layer 10; and then
- A second organic substrate S2, identical to the first.

In this example, there is therefore a bilayer electrolyte based on a polymer normally used in this type of glazing, which is "lined" with a layer of hydrated tantalum oxide that is sufficiently conducting not to impair proton transfer via the polymer and that protects the back electrode made of anodic electrochromic material from direct contact with the latter, the intrinsic acidity of which would be prejudicial thereto.

Instead of the hydrated $Ta_2O_5$ layer, a layer of the hydrated $Sb_2O_5$ or $TaWO_x$ type may be used.

It is also possible to provide a three-layer electrolyte, with two hydrated oxide layers, either with one of them on each side of the polymer layer, or with the two layers superposed one on the other on the side facing the layer of anodic electrochromic material.

According to yet another alternative embodiment, a barrier layer 11 is intended to be provided between the organic layer and the electronically conductive layer TC1 and/or TC2 (to be seen in particular in FIG. 3 and in FIG. 4) based on a nitride, oxide, oxynitride or carbide, chosen from silicon and aluminum or based on aluminum nitride or oxynitride or carbide or on a mixture of at least two of these compounds (mixed Si/Al nitrides or oxynitrides); this barrier layer has a thickness of 50 nm to 500 nm and preferably from 100 nm to 300 nm.

As a variant, this barrier layer may be composed of several inorganic layers, chosen from those mentioned above, or an alternation of organic and inorganic layers, the organic layer being chosen from polysiloxanes, polysilanes, polyacrylates, polyacetates, polyesters, and celluloses.

According to yet another variant, the barrier layer may be made from tin oxide, zinc oxide, titanium oxide, chromium oxide, copper oxide, germanium oxide, indium oxide, iridium oxide, antimony oxide, tantalum oxide, zirconium oxide or a compound of the $SiO_xC_yH_z$ or $TiO_xC_yH_z$ type.

A third example (illustrated in general by FIGS. 1 to 3, except as regards the organic layer 10, which is absent) corresponds to a "five-layer" system using an organic substrate of the PMMA slab type with a thickness of 4 mm, which has undergone as a sole treatment an RBS washing before the metal oxide layers are deposited. It consists of:

a first 4 mm organic substrate S1, for example made of drawn PMMA;
of an ITO-based TCO layer 2 was deposited with a thickness of 500 nm;
of an EC1/EL/EC2 multilayer (forming the system 3) judiciously chosen from the abovementioned oxide layers were deposited;
of an ITO-based TCO layer 4;
of a second 4 mm organic substrate S2, for example made of drawn PMMA.

The substrate S1 made of drawn PMMA on which the abovementioned multilayer was deposited is then laminated, to S2 at the same time as the connections are placed thereon, by means of an interlayer f1 made of PU and an inorganic glass back pane.

The cell thus obtained is then cycled between −2 V and 1 V so as to color and bleach it. Irrespective of the times for coming to equilibrium at a given potential (2 min, 10 min or 60 min), the measured light transmission levels at the two potentials are close to 50%. The cell is therefore non-functional and many cracks are observed, with the naked eye, at the multilayer, these being the sign of poor adhesion between the organic substrate and the electronically conductive and/or electroactive layers.

A fourth example (illustrated by FIGS. 1-3) corresponds to a "five-layer" system using an organic substrate of the type consisting of a PMMA slab 4 mm in thickness on which a polysiloxane-based organic varnish layer 10 was deposited by flow coating. Precisely the same metal oxide layers as those described in the third example were then deposited on the PMMA slab+the polysiloxane-based varnish, keeping the same deposition conditions as those used in the third example. The assembly of the cell by laminations with a PU interlayer as well as the positioning of the connections also remain identical to those of the third example.

The cell thus obtained is then cycled between −2 V and 1 V so as so color and bleach it. The cell thus switches from a dark blue color to a brownish-gray color, and the light transmission values, measured after equilibrium times of 2 minutes, vary from 2% to 50%. The functionality of this cell produced on the PMMA slab+siloxane-based varnish 10 is completely satisfactory, with a contrast of 25 and with no cracking being observed, whether with the naked eye or with a microscope.

A fifth example illustrates, within the context of the invention, the protection that the organic varnish on a polymer substrate such as PMMA provides. Drops of propylene carbonate (about 2 ml) were deposited on 3 PMMA-based substrates:

bare PMMA;
PMMA+organic (polysiloxane-based) varnish;
PMMA+organic (polysiloxane-based) varnish+ITO layer.

After several hours at room temperature, the propylene carbonate reacted with the bare PMMA, whereas no reaction was observed on the other two substrates. After wiping, the propylene carbonate drop leaves a trace on the bare PMMA— this trace corresponds to a swollen area, with an overall increase in thickness of about 6 microns relative to the area that was not in contact with the propylene carbonate.

Figure 6A:
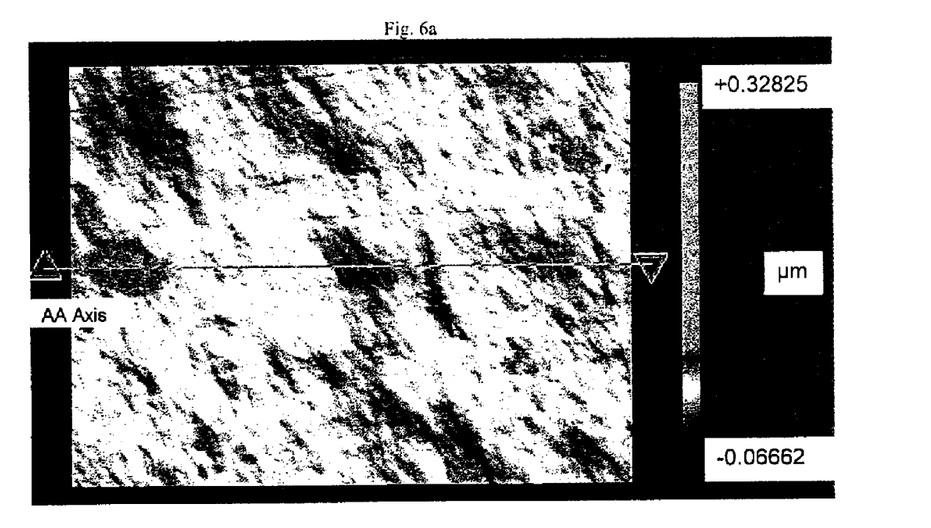
FIGS. 6a and 6b illustrate, respectively, an image of the surface and a roughness curve obtained (along the AA axis) of the bare PMMA on which no solvent has been deposited.
Figure 6B:
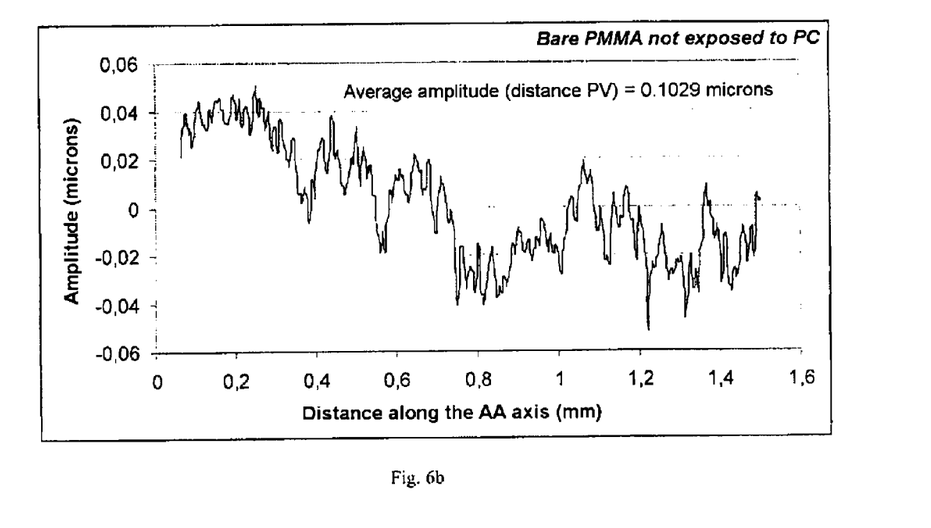
Figure 7A:
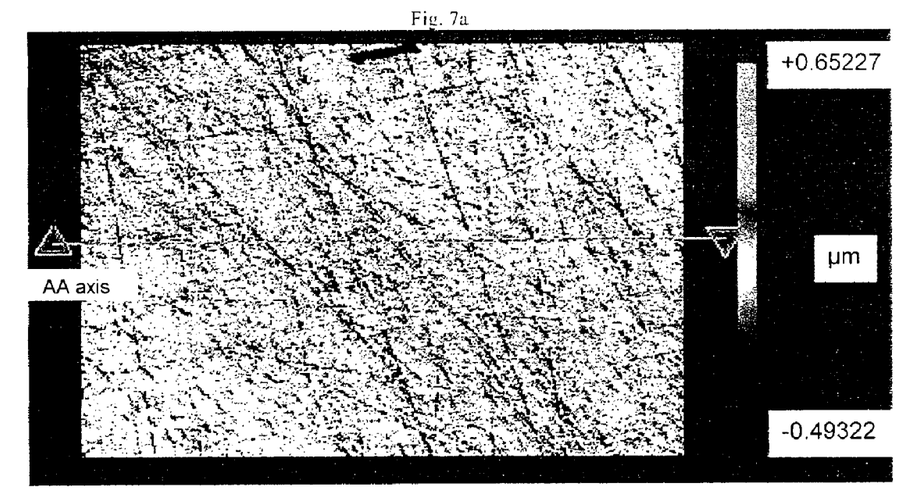
FIGS. 7a and 7b illustrate, respectively, a surface image and a roughness curve obtained (along the AA axis) of the bare PMMA on which a drop of propylene carbonate has been deposited.
Figure 7B:
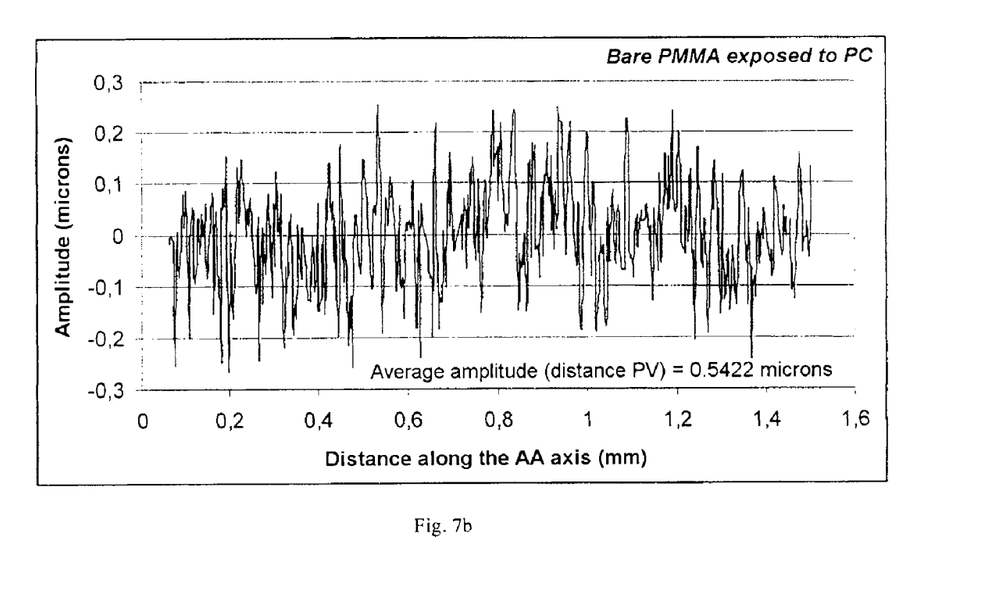
Figure 8A:
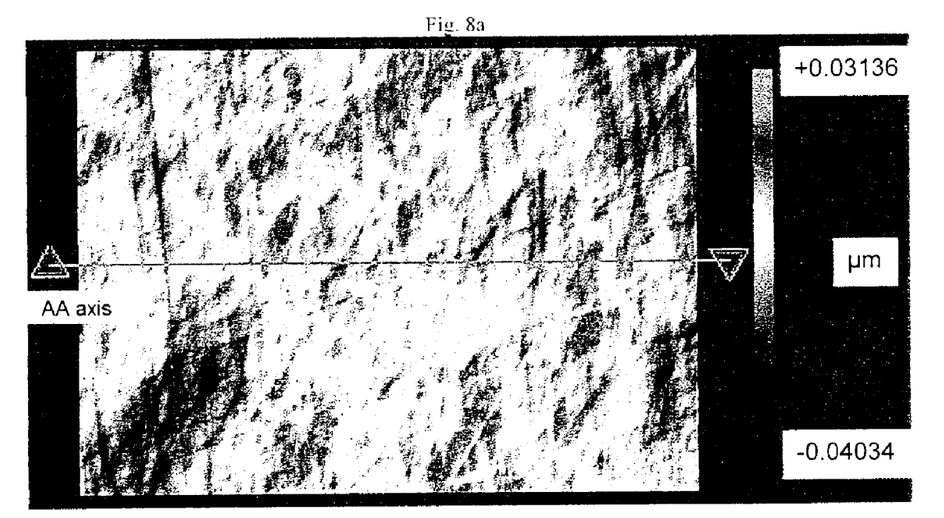
FIGS. 8a and 8b illustrate, respectively, a surface image and a roughness curve obtained (along the AA axis) of the PMMA coated with an organic varnish on which no solvent has been deposited.
Figure 8B:
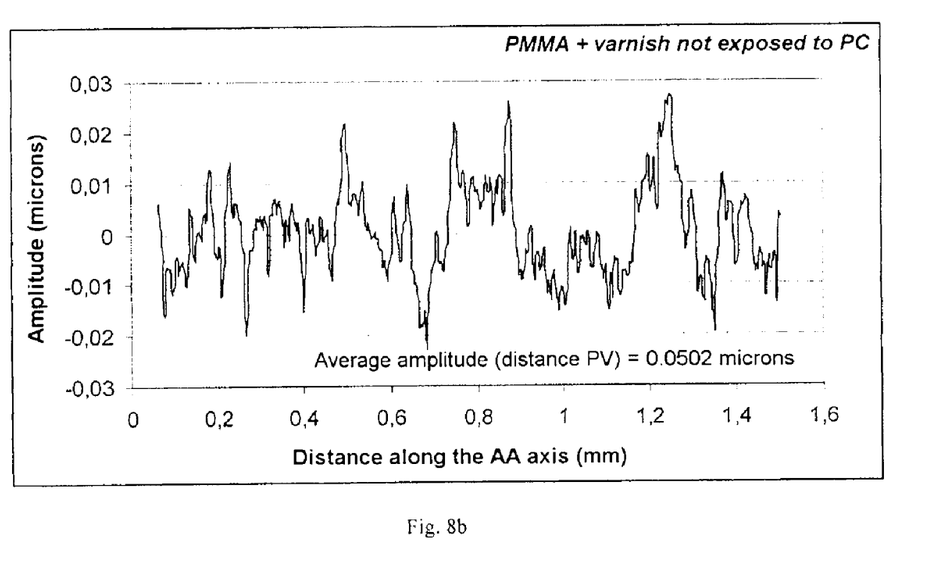
Figure 9A:
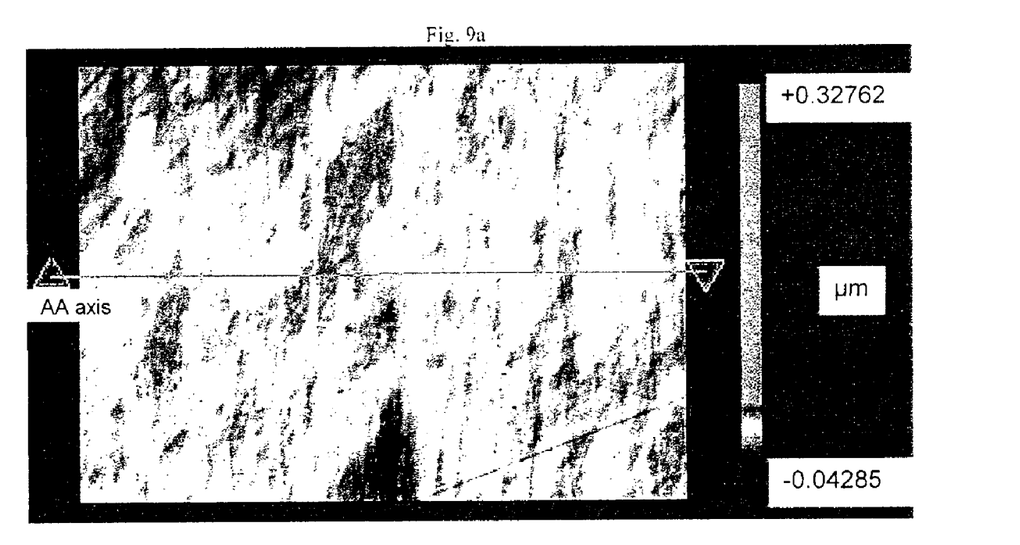
FIGS. 9a and 9b illustrate, respectively, a surface image and a roughness curve obtained (along the AA axis) of the PMMA coated with an organic varnish on which a drop of propylene carbonate has been deposited.
Figure 9B:
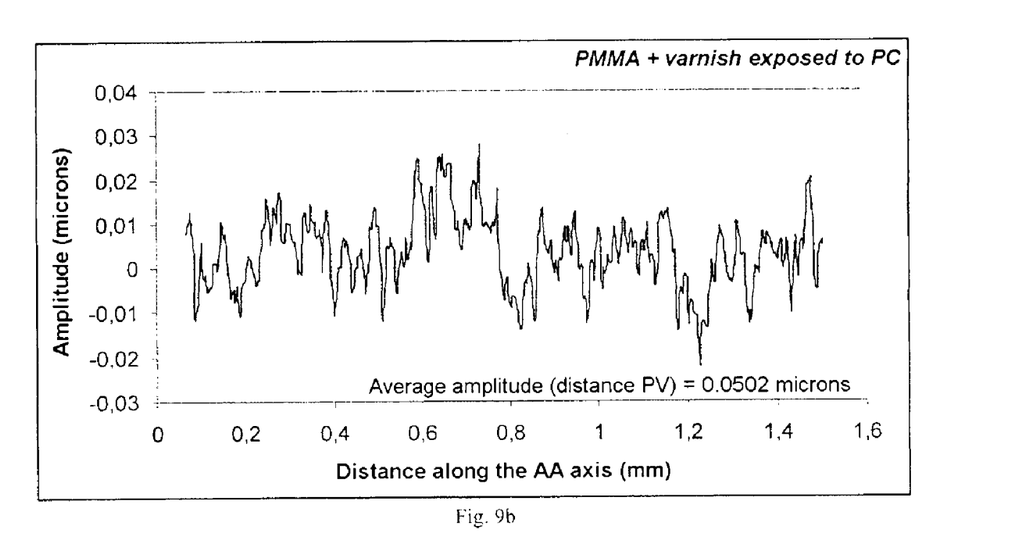

In addition, on the bare PMMA and on the PMMA+organic varnish, the areas on which propylene carbonate drops had been deposited were analyzed using a profilometer and compared with the areas that had never been in contact with propylene carbonate. FIGS. 6a to 9a show the surface images and the roughness curves thus obtained (FIGS. 6a to 9b). The surfaces shown in FIGS. 6a and 7b are very different and in addition, the average distance PV (the distance between the top of the peaks and the bottom of the valleys) of the roughness curves passes from 0.1 to 0.54 microns between the bare PMMA, on which no solvent was deposited, and the bare PMMA on which a drop of propylene carbonate was deposited. This corresponds to deeper grooves on the bare PMMA in contact with propylene carbonate than on the bare PMMA that was never in contact with propylene carbonate. However, the surface images in FIGS. 8a and 9a are similar and the average distance PV is identical in the case of the PMMA+ organic varnish area on which a drop of PMMA was deposited and on the PMMA+organic varnish area on which no solvent was deposited.

The invention claimed is:

1. An electrochemical system comprising at least one substrate of organic nature, at least one electronically conductive layer and at least one active species, wherein it includes at least one organic layer lying between the electronically conductive layer and the substrate, a barrier layer, based on silicon nitride, oxide or oxynitride, or based on aluminum nitride or oxide or oxynitride or on a mixture of at least two of these compounds (mixed Si/Al nitrides or oxynitrides) said barrier layer interposed between a varnish layer and the electronically conductive layer.

2. The electrochemical system as claimed in claim 1, wherein the substrate comprises PMMA.

3. The system as claimed in claim 1, wherein the substrate is drawn PMMA.

4. The system as claimed in claim 1, wherein the organic layer is a polysilaxane-based varnish.

5. The system as claimed in claim 4, wherein the organic layer has a thickness between 0.5 µm and 10 µm.

6. The system as claimed in claim 1, wherein the electronically conductive layer is the metallic or a TCO (transparent conductive oxide) made of ITO, $SnO_2$:F, ZnO:Al, or a multilayer of TCO/metal/TCO, this metal selected from the group consisting of silver, gold, platinum and copper, or a multilayer of NiCr/metal/NiCr, the metal also selected from the group consisting of silver, gold, platinum and copper.

7. The system as claimed in claim 6, wherein the barrier layer has a thickness from 50 nm to 500 nm.

8. The system as claimed in claim 1, wherein the active layer AC comprises in one and the same medium, an anodic-coloration and a cathodic-coloration electroactive material, at least one solvent, optionally at least one polymer and optionally at least one ionic salt acting, if necessary, as an electrolyte.

9. The system as claimed in claim 8, wherein the anodic-coloration species is a phenazine derivative selected from the group consisting of 5,10-dihydrophenazine, 1,4-phenylenediamine, benzidine, metallocene, phenothiazine and carbazole.

10. The system as claimed in claim 8, wherein the cathodic-coloration species is a viologen (a bipyridinium salt) selected from the group consisting of methyl viologen tetrafluoroborates, octyl viologen tetrafluoroborates, or quinone or polythiophene.

11. The system as claimed in claim 8, wherein the solvent is selected from the group consisting of dimethyl sulfoxide, N,N-dimethylformamide, propylene carbonate, ethylene carbonate, N-methylpyrrolidinone, γ-butyrolactone, ionic liquids, ethylene glycols, alcohols, ketones and nitriles.

12. The system as claimed in claim 8, wherein the polymer is selected from the group consisting of polyether, polyester, polyamide, polyimide, polycarbonate, polymethacrylate, polyacrylate, polyacetate, polysilane, polysiloxane and cellulose.

13. The system as claimed in claim 8, wherein the ionic salt is selected from the group consisting of lithium perchlorate, trifluoromethanesulfonate (triflate) salts, trifluoromethanesulfonylimide salts, ammonium salts or ionic liquids.

14. The system as claimed in claim 8, wherein the layer AC has a thickness from 50 μm to 500 μm.

15. The system as claimed in claim 1, wherein the active species is in the form of an electrochemically active layer comprising at least one of the following compounds: tungsten (W) oxide, niobium (Nb) oxide, tin (Sn) oxide, bismuth (Bi) oxide, vanadium (V) oxide, nickel (Ni) oxide, iridium (Ir) oxide, antimony (Sb) oxide or tantalum (Ta) oxide, by itself or as a mixture, and optionally including an additional metal such as titanium, tantalum or rhenium.

16. The system as claimed in claim 1, wherein it further comprises a layer having an electrolytic function, selected from the group consisting of silicon nitride ($Si_3N_4$), molybdenum oxide ($MoO_3$), tantalum oxide ($Ta_2O_5$), antimony oxide ($Sb_2O_5$), nickel oxide ($NiO_x$), tin oxide ($SnO_2$), zirconium oxide ($ZrO_2$), aluminum oxide ($Al_2O_3$), silicon oxide ($SiO_2$), niobium oxide ($Nb_2O_5$), chromium oxide ($Cr_2O_3$), cobalt oxide ($Co_3O_4$), titanium oxide ($TiO_2$), zinc oxide (ZnO) optionally alloyed with aluminum, tin zinc oxide ($SnZnO_x$), vanadium oxide ($V_2O_5$), at least one of these oxides being optionally hydrogenated or nitrided, the electrochemically active material and the materials having an electrolytic function are included in one and the same medium.

17. An electrochromic glazing, wherein it comprises the electrochemical system as claimed in claim 1, having in particular a variable light and/or energy transmission and/or reflection, with the transparent or partially transparent substrate or at least some of the transparent or partially transparent substrates, made of a plastic, preferably mounted as multiple and/or laminated glazing or as double glazing.

18. An electrochromic glazing, comprising the electrochemical system as claimed in claim 1, wherein it is combined with at least one other layer suitable for providing said glazing with an additional functionality (solar-control, low-E, hydrophobic, hydrophilic or antireflection functionality).

19. A process for manufacturing the electrochemical device as claimed in claim 1, wherein at least one of the layers of the electrochemical system is deposited by a sputtering vacuum technique, optionally magnetron or magnetically enhanced sputtering, by thermal evaporation or electron-beam evaporation, by laser ablation, by CVD, optionally plasma-enhanced or microwave-enhanced CVD, or by an atmospheric-pressure technique, especially by the deposition of layers by sol-gel synthesis, particularly dip coating, spray coating or laminar flow coating.

20. A method of coating a support, comprising applying the glazing as claimed in claim 17 to an architectural support, an automotive support, an industrial or public transport vehicle support, a railroad vehicle support, a ship and aircraft support, particularly as windows, rear-view mirrors and other mirrors.

21. The system as claimed in claim 4, wherein the organic layer has a thickness from 1 μm to 3 μm.

22. The system as claimed in claim 6, wherein the barrier layer has a thickness from 100 nm to 300 nm.

23. The system as claimed in claim 8, wherein the layer AC has a thickness from 150 μm to 300 μm.

* * * * *